Patented Aug. 3, 1937

2,088,907

UNITED STATES PATENT OFFICE 2,088,907

POLYAZO DYESTUFFS

Karl Holzach, Ludwigshafen-on-the-Rhine, Ludwig Neumann, Mannheim, and Hans Krzikalla, Ludwigshafen - on - the - Rhine, Germany, assignors to General Aniline Works, Inc., New York, N. Y., a corporation of Delaware No Drawing. Application May 7, 1936, Serial No. 78,402. In Germany June 1, 1935

8 Claims. (Cl. 260—38.5)

The present invention relates to polyazo dyestuffs.

We have found that valuable black polyazo dyestuffs are obtained by causing the tetrazo compound of a 4.4'-diaminodiphenyl to react in an acid liquid with a sulfonic acid of 1-amino-8-hydroxynaphthalene which is capable of coupling twice, the compound thus obtained being coupled in slightly alkaline solution with the diazo compound of any aromatic amine, the resulting disazo dyestuff which still contains a free diazo group being finally coupled in a strongly alkaline liquid with a 2.4-dihydroxyquinolone or a 4-hydroxyquinolone. The sequence in which the individual compounds are caused to react with each other may be varied as desired. For example, after the said coupling of the 1-amino-8-hydroxynaphthalene sulfonic acid used, the free diazo group of the 4.4'-diamino-diphenyl may first be saturated by coupling with the dihydroxyquinoline, the alkaline coupling being completed with various amines. Mixtures of different 4.4'-diaminodiphenyls may be likewise employed.

The dyestuffs obtainable in this manner are suitable for dyeing wool, silk, cotton and mixed fabrics of these fibres, and also of papers, but especially for dyeing leather of all kinds, because they have excellent fastness to water, alkalies and acids as well as great stability to acids. They penetrate so deeply into the leather that they are especially valuable for dyeing velour leather by reason of the resulting fastness to polishing. Generally speaking the dyestuffs dye greenish black shades.

The following examples will further illustrate how the said invention may be carried out in practice, but the invention is not restricted to these examples. The parts are by weight.

Example 1

The tetrazo compound derived from 184 parts of 4.4'-diaminodiphenyl is mixed in a liquid rendered acid with mineral acid with 319 parts of 1-amino-8-hydroxynaphthalene-3.6-disulfonic acid, the resulting compound being coupled at 5° C. in a slightly alkaline solution with the diazo compound of 218 parts of 1-amino-2-nitrobenzene-4-sulfonic acid. The coupling is completed in a few minutes. The disazo dyestuff still containing a diazo group of the tetrazobenzidine thus obtained is then coupled in a more strongly alkaline solution with 2.4-dihydroxyquinoline by introducing a solution of 183 parts of its monosodium salt, to which 100 parts of 38 per cent caustic soda solution have been added, and completing the coupling by stirring for several hours at room temperature. After heating for a short time, the dyestuff is separated by salting out. It dyes animal fibres greenish black shades.

If 277 parts of 1-aminoazobenzene-4'-sulfonic acid be employed instead of 1-amino-2-nitrobenzene-4-sulfonic acid, there is obtained after coupling with 2.4-dihydroxyquinoline, a polyazo dyestuff which likewise yields greenish black shades, while by employing the diazo compound of 173 parts of 1-aminobenzene-4-sulfonic acid, a trisazo dyestuff of somewhat more blue shade of color is obtained.

For the alkaline coupling of the 1-amino-8-hydroxynaphthalene-3.6-disulfonic acid, any other diazotizable aromatic amines may be employed. In order to obtain sufficiently soluble dyestuffs, it is preferable to select amines containing sulfonic or carboxylic acid groups. For example aminonaphthalene sulfonic acids, aminodiphenylamine sulfonic acids, aminohydroxybenzene sulfonic acids, aminohydroxybenzene carboxylic acids and aminobenzene carboxylic acids may be mentioned for the purpose.

Example 2

The intermediate compound obtainable according to Example 1 from 4.4'-diaminodiphenyl, 1-amino-8-hydroxynaphthalene-3.6-disulfonic acid and 1-amino-2-nitrobenzene-4-sulfonic acid is finally coupled with 2.4-dihydroxyquinoline sulfonic acid (obtainable in the following manner: 112.7 parts of 2.4-dihydroxyquinoline are, while stirring, introduced into 225.4 parts of 24 per cent oleum at about 25° C. The reaction mass is then poured into 700 parts of water. After stirring for several hours the reaction product which is a sulfonic acid of 2.4-dihydroxyquinoline containing most probably the sulfonic acid group in the 6- or 7-position, is filtered off by suction and washed with water) by adding a solution of 241 parts of the said acid with 212 parts of calcined soda and 2500 parts of water to the solution of the said compound, the coupling being completed by stirring for several hours. After salting out and working up, a dyestuff is obtained which yields greenish black dyeings on velour leather.

When employing the said dihydroxyquinolinesulfonic acid, amines free from sulfonic acid groups may also be employed for the alkaline coupling of the 1-amino-8-hydroxynaphthalene-3.6-disulfonic acid, as for example simple aminobenzene, because the dyestuffs containing three sulfonic acid groups are already sufficiently soluble.

Instead of 2.4-dihydroxyquinoline or its sulfonic acid, other derivatives thereof capable of being coupled may be used, as for example N-methyl-4-hydroxyquinolone. For example to the intermediate compound described in Example 1 there may be added a solution of 106 parts of anhydrous soda, a solution of 175 parts of the said quinolone in 120 parts of 38 per cent caustic soda solution and 2500 parts of water being allowed to flow directly therein. The coupling is completed by stirring for several hours and the dyestuff is separated in the usual manner. It dyes animal fibres powerful greenish-black shades.

If the corresponding 4.6-disulfonic acid be employed instead of 1-amino-8-hydroxynaphthalene-3.6-disulfonic acid, a dyestuff is obtained which also yields greenish black dyeings. Finally, instead of 4.4'-diaminodiphenyl, its derivatives may be employed, as for example 4.4'-diamino-3.3'-dimethyldiphenyl, 4.4'-diamino-3.3'-dichlordiphenyl or the corresponding 3.3'-disulfonic acid.

*Example 3*

An aqueous solution acid to litmus of 319 parts of 1-amino-8-hydroxynaphthalene-3.6-disulfonic acid and 53 parts of anhydrous sodium carbonate is allowed to flow in the course of one hour while stirring into a solution, rendered acid with hydrochloric acid, of the tetrazo compound of a mixture of about 129 parts of 4.4'-diaminodiphenyl and about 64 parts of 4.4'-diamino-3.3'-dimethyldiphenyl. The whole is stirred for a further hour at 5° C. and the mineral acid still present is then neutralized in the course of further 8 hours by slowly adding an aqueous solution of 53 parts of anhydrous sodium carbonate and by adding in the course of further 8 hours a solution of 68 parts of crystallized sodium acetate. The solution now has a pH value of 3.9. After the addition of ice the solution is admixed at 5° C. with the diazo solution from 173 parts of 1-aminobenzene-4-sulfonic acid and then with a solution of 300 parts of anhydrous sodium carbonate, whereby the mixture obtains a pH value of about 8.5. As soon as after about half an hour the diazo compound of the 1-aminobenzene-4-sulfonic acid has disappeared, coupling is completed by introducing a solution of 183 parts of the monosodium salt of 2.4-dihydroxyquinoline to which 100 parts of 38 per cent caustic soda solution have been added and by stirring for several hours. The dyestuff formed which is easily soluble in water is salted out and worked up in the usual manner. It yields greenish black shades having excellent properties on chrome-tanned velour leather.

Mixtures of the above mentioned diamino diphenyls in other proportions may be employed, for example a mixture of about 64 parts of 4.4'-diaminodiphenyl and about 138 parts of 4.4'- diamino-3.3'-dimethyldiphenyl. Instead of mixtures of the said diaminodiphenyls 4.4'-diamino-3.3'-dimethyldiphenyl alone may be likewise employed.

*Example 4*

The diazo compound of the monoazo dyestuff, obtained by coupling the tetrazo compound of 184 parts of 4.4'-diaminodiphenyl with 319 parts of 1-amino-8-hydroxynaphthalene-3.6-disulfonic acid is coupled in a solution, rendered slightly alkaline by the addition of sodium carbonate, with the diazo compound of 253 parts of 1-aminobenzene-2.4-disulfonic acid. The disazo dyestuff still containing a free diazo group is then coupled in a strongly alkaline solution with a solution of 211 parts of dihydroxynaphthoquinoline (7.8-benzo-2.4-dihydroxyquinoline prepared from 1-aminonaphthalene and maleic acid diethyl ester) to which 180 parts of 38 per cent caustic soda solution have been added and the coupling is completed by stirring for several hours.

The trisazo dyestuff thus prepared yields strong deep greenish black shades on leather.

What we claim is:

1. Polyazo dyestuffs corresponding to the general formula

D—N=N—A—N=N—B—N=N—C wherein A stands for a diphenyl radicle, B stands for the radicle of a 1-amino-8-hydroxynaphthalene sulfonic acid capable of coupling twice, C stands for a member of the group consisting of radicles of the benzene, naphthalene and diphenyl series and D stands for a radicle of the group consisting of 2.4-dihydroxyquinolines and 4-hydroxyquinolones.

2. Polyazo dyestuffs corresponding to the general formula

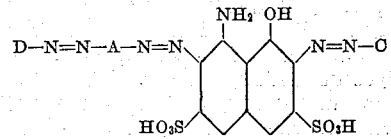

wherein A stands for a diphenyl radicle, C stands for a member of the group consisting of radicles of the benzene, naphthalene and diphenyl series and D stands for a radicle of the group consisting of 2.4-dihydroxyquinolines and 4-hydroxyquinolones.

3. Polyazo dyestuffs corresponding to the general formula

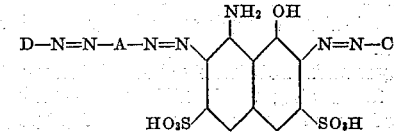

wherein A stands for a diphenyl radicle, C stands for a member of the group consisting of sulfonic acid radicles of the benzene, naphthalene and diphenyl series and D stands for a radicle of the group consisting of 2.4-dihydroxyquinolines and 4-hydroxyquinolones.

4. Polyazo dyestuffs corresponding to the general formula

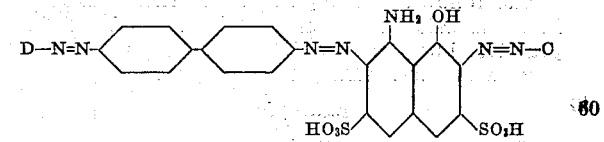

wherein C stands for a member of the group consisting of sulfonic acid radicles of the benzene, naphthalene and diphenyl series and D stands for a radicle of the group consisting of 2.4-dihydroxyquinolines and 4-hydroxyquinolones.

5. Polyazo dyestuffs corresponding to the general formula

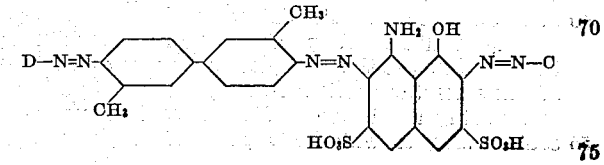

wherein C stands for a member of the group consisting of sulfonic acid radicals of the benzene, naphthalene and diphenyl series and D stands for a radicle of the group consisting of 2.4-dihydroxyquinolines and 4-hydroxyquinolones.

6. The trisazo dyestuff corresponding to the formula

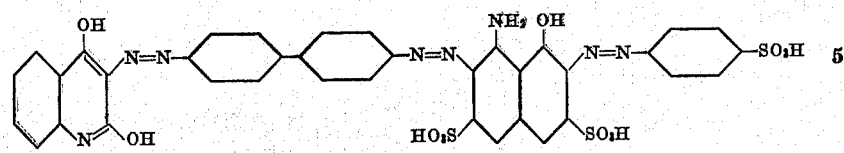

7. The trisazo dyestuff corresponding to the formula

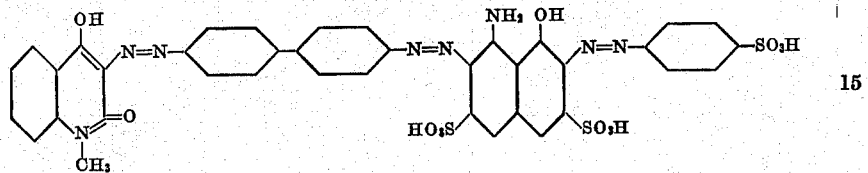

8. The trisazo dyestuff corresponding to the formula

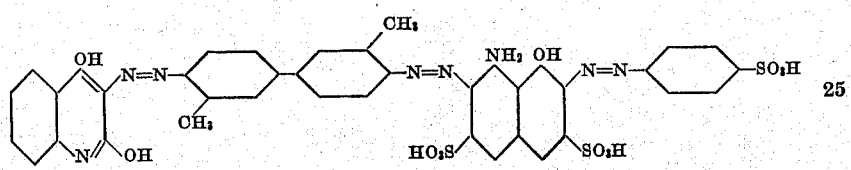

KARL HOLZACH.
LUDWIG NEUMANN.
HANS KRZIKALLA.